United States Patent

[11] 3,571,738

[72] Inventor Detlef C. Gloge
 Matawan, N.J.
[21] Appl. No. 760,410
[22] Filed Sept. 18, 1968
[45] Patented Mar. 23, 1971
[73] Assignee Bell Telephone Laboratories Incorporated
 Murray Hill, N.J.

[54] FOLDED OPTICAL DELAY LINE
 3 Claims, 3 Drawing Figs.
[52] U.S. Cl. ................................................ 330/4.3,
 331/94.5, 330/56, 250/199
[51] Int. Cl. ........................................ H03f 1/00,
 H01s 3/00
[50] Field of Search .......................... 331/94.5;
 330/4.3, 56; 250/199, (AIAA ABSTRACTS),
 (STAR ABSTRACTS), (PHYSICS ABSTRACTS)

[56] References Cited
UNITED STATES PATENTS
3,437,954 4/1969 Herriott et al. ............... 340/4.3X
3,253,226 5/1966 Herriott et al. ............... 340/4.3
*Primary Examiner*—Ronald L. Wibert
*Assistant Examiner*—R. J. Webster
*Attorneys*—R. J. Guenther and Arthur J. Torsiglieri ABSTRACT: By operating a folded (cavity) delay line in a mismatched mode, it is found that the delay time can be increased by decreasing the distance between the cavity mirrors. The cavity parameters are given for optimum delay. To compensate for the mirror losses produced by each reflection, some means for producing gain is advantageously associated with the delay line.

PATENTED MAR 23 1971　　　　　　　　　　　　　　　　　　3,571,738

INVENTOR
D.C. GLOGE
BY Sylvan Sherman
ATTORNEY

FOLDED OPTICAL DELAY LINE

This application relates to folded optical delay lines and storage cells.

BACKGROUND OF THE INVENTION

In an article entitled "Folded Optical Delay Lines" by D. R. Herriott and H. J. Schulte, published in the Aug. 1965 issue of Applied Optics, a cavity arrangement is described for obtaining long optical paths for use as a delay line or storage cell. In a device of this type, a beam is reflected back and forth repeatedly between two spherical mirrors which, because of their converging power, minimize diffraction losses. After many reflections, the beam is extracted from the cavity.

It is a principal advantage of a folded delay line that very long optical paths can be obtained in a relatively small volume.

Two modes of operation are described by Herriott and Schulte in the above-identified article. In the first mode, referred to as a matched mode of operation, the beam size is the same at both mirrors. In the second mode of operation, referred to as the mismatched mode, the beam sizes at the two mirrors are different. As noted by Herriott et al. it is an advantage of the mismatched mode that improved beam separation is realized.

SUMMARY OF THE INVENTION

The present invention is based upon the recognition that in addition to improving the beam separation, the total delay time in a folded delay line is significantly increased when operated in the mismatched mode. More particularly, optimum beam and cavity parameters are given for maximum delay. It is shown that the delay obtained in the mismatched mode can be increased by reducing the distance between mirrors, thereby further reducing the total volume of the delay line. This, of course, is in contradistinction to the prior art which teaches that increased delay requires increasing the size of the cavity.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
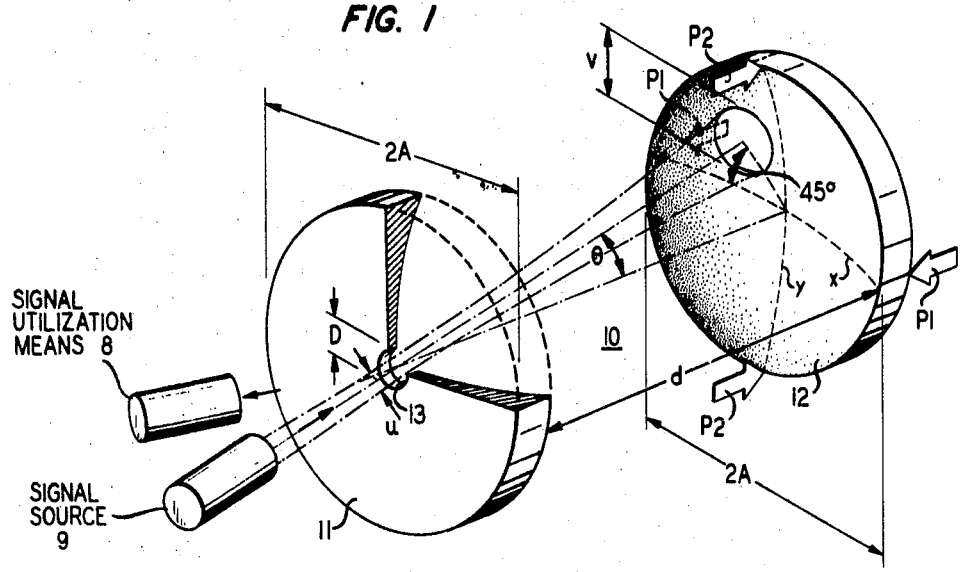
FIG. 1 shows a cavity delay line in accordance with the invention.

Referring to the drawing, FIG. 1 shows an optical system including a folded delay line, or optical cavity 10, an optical signal source 9, and signal utilization means 8. Source 9 can be either a laser source, or the terminal end of an optical transmission line. Similarly, utilization means 8 can be either some type of optical apparatus or the terminal end of an optical transmission line.

Cavity 10 comprises a pair of spaced mirrors 11 and 12. One of the mirrors 11 is a spherical mirror of focal length $f$ and diameter $2A$. The other mirror 12 is made slightly aspherical so as to increase the number of reflections and, hence, the delay in the manner described by Herriott et al. in the above-identified article. As indicated therein, the astigmatism require for this purpose is very small and amounts to no more than a few wavelengths. This can be conveniently accomplished by distorting a spherical mirror by the application of slight forces along two perpendicular axes, as indicated in FIG. 1. The first set of forces $P_1$ reduces the radius of curvature along one of these directions, designated the $x$-direction in FIG. 1. The second set of forces $P_2$ increases the radius of curvature along the other direction, designated the $y$-direction. The resulting $x$ and $y$ direction focal lengths are identified as $f_x$ and $f_y$.

The incident beam, derived from source 9, is introduced into cavity 10 through an aperture 13 at the center of mirror 11. As is known, delay is obtained in this type of delay line by virtue of the fact that a beam introduced into the cavity at an angle to the cavity axis is reflected back and forth between mirrors 11 and 12 many times before it again reaches aperture 13 and exits. In accordance with the present invention, this delay is maximized by operating the cavity in the mismatched mode in which the cavity parameters are related as follows:

1. Diameter D of aperture 13:

$$D = 2\sqrt{2}\,\frac{k^2 d\lambda}{A};  \qquad (1)$$

2. Input beam diameter:

$$\omega = \frac{D}{k} = 2\sqrt{2}\,\frac{kd\lambda}{A}; \qquad (2)$$

3. Mirror 11 focal length:

$$f = \frac{d}{2 - \dfrac{\pi}{\sqrt{N/2}}}; \qquad (3)$$

4. Mirror 12 focal lengths:

$$f_x = \frac{d}{2 - \pi\left(\dfrac{1}{N/2} - \dfrac{1}{N/2}\right)}; \qquad (4)$$

and $$f_y = \frac{d}{2 - \pi\left(\dfrac{1}{N/2} + \dfrac{1}{N/2}\right)}; \qquad (5)$$

where:
$N$ is the number of transits the beam makes in the cavity;
$d$ is the center-to-center mirror spacing;
$A$ is the mirror radius;
$W$ is the optimum beam width at aperture 13 ($1/e$-width for a beam with a Gaussian profile);
$k$ is the beam density factor (determined by the scattering and distortion of the beam; ideally $k = 1$; typically $k > 1$).

Source 9 is aligned with respect to the aperture of cavity 10 such that the incident beam is directed into the cavity at an angle $\theta$ with respect to the cavity axis and at an azimuthal angle of 45° with respect to the $x$ and $y$ axes on mirror 12, where the angle $\theta$ is given by:

$$\theta \approx \frac{A}{d}\left(\frac{1}{2 - \dfrac{1}{\sqrt{2}}}\right). \qquad (6)$$

When proportioned in the manner set forth above, the total resulting delay time $\tau$ is given by:

$$\tau = \frac{cA^4}{2d\lambda^2 k^4}. \qquad (7)$$

The number of transits $N$ that the beam makes in the cavity during this time is $$N = \frac{\tau c}{d}, \qquad (8)$$

and the beam size on mirror 12 is $$v = \frac{2A}{k}\left(\frac{1}{3 + \sqrt{2}}\right); \qquad (9)$$

where:
$\lambda$ is the wavelength of the beam; and
$c$ is the beam velocity in the cavity.

It will be noted from equation (7) that in a cavity delay line, in accordance with the present invention, the delay time $\tau$ varies inversely with respect to the cavity size $d$. Thus, increased delay time is realized by decreasing the size of the cavity. However, since the number of reflections and, consequently, the losses increase significantly in a short cavity, some means of amplification is advantageously provided.

Figure 2:
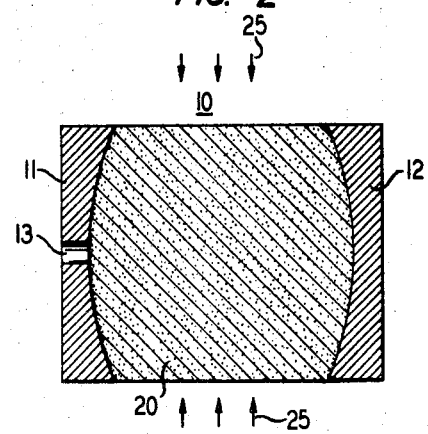
FIG. 2 shows the delay line of FIG. 1 including an amplifier within the cavity.

FIG. 2 shows a delay line wherein means for amplifying the signal are provided within the cavity. In this arrangement the cavity volume bounded by mirrors 11 and 12 is filled with an active laser material 20, such as, for example, neodymium glass. Means, represented by arrows 25, are included for pumping the laser material in accordance with techniques well known in the art.

With the gain provided by the laser material, mirror losses of the order of 0.05 percent per reflection, can be compensated for. In this embodiment the delay time is limited by the cross-scattering at the mirror surfaces and in the amplifying medium.

Figure 3:
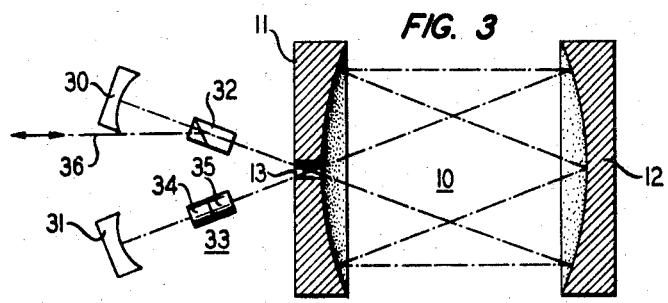
FIG. 3 shows a storage device including, in combination, a nonlinear amplifier and the delay line of FIG. 1.

In the storage cell shown in FIG. 3, the amplifying medium can be located outside of the cavity. More specifically, the storage cell shown includes a cavity 10, mirrors 30 and 31, an optical switch 32 and an amplifier 33. In order to avoid self-oscillations, the amplifier advantageously comprises a nonlinear laser-absorber system 34—35. One such system includes a laser amplifier combined with an absorber that saturates more readily than the laser. An example of such an absorber is a 5 cm. long saturable dye cell. A second system includes a $2\pi$-pulse amplifier, an example of which is a $CO_2$ laser and an $SF_6$ cell, both of which are of the order of 30 cm. long. Alternatively, a HeNe laser can be used on combination with a 30 cm. long Ne cell.

In all of the above-described arrangements it is readily understood that the amplifier is selected to provide gain at the signal frequency.

Referring again to FIG. 3, a light beam 36 is directed into cavity 10 through the aperture 13 in mirror 11 by means of switch 32. After circulating within cavity 10, the beam leaves the cavity and passes through amplifier 33 and onto mirror 31 where it is reflected back through amplifier 33 and back into cavity 10. After recirculating within cavity 10 the beam again enters switch 32. Depending upon the state of the switch, the beam either leaves the system, or impinges upon mirror 30 and is reflected back into cavity 10 wherein the process is repeated.

Because of the gain provided by amplifier 33, the information can be stored in such a system indefinitely. It will also be noted that because of the nonlinear nature of the amplifier-absorber combination, only pulses of predetermined length and intensity are amplified. Hence, the storage time is not limited by scattering as in the embodiment of FIG. 2, which uses a linear amplifier.

With the addition of gain, there is essentially no lower limit to the mirror spacing $d$. From equations (7) and (8) a 500 meter long beam path ($N \times d$) could be stored in a cavity 10 cm. long and 2 cm. in diameter at a wavelength of one micron. Storing PCM at a bit rate of 16 G bits/sec, yields a storage capacity of 25 K bits.

In the limit, there is no reason why the mirrors could not be moved so close to one another that they touch at their circumferences. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

I claim:

1. A cavity delay line for use at optical frequencies comprising:

a first spherical mirror having a radius A and focal length $f$;

a second aspherical mirror having a radius A and focal lengths $f_x$ and $f_y$ along two mutually perpendicular axes;

said mirrors being spaced apart a distance $d$;

an aperture of diameter $D$ located at the center of said first mirror;

a source of optical wave energy aligned to direct in a mismatched mode an optical beam of diameter $D/k$ into said cavity through said aperture at an angle $\theta$ with respect to the cavity axis and at an azimuthal angle of 45° with respect to said axes;

where $\tau = \dfrac{cA^4}{2d\lambda^2 k^4}$;

$N = \dfrac{\tau c}{d}$;

$f = \dfrac{d}{2 - \dfrac{\pi}{\sqrt{N/2}}}$;

$f_x = \dfrac{d}{2 - \pi \left( \dfrac{1}{\overline{N/2}} - \dfrac{1}{\overline{N/2}} \right)}$;

$f_y = \dfrac{d}{2 - \pi \left( \dfrac{1}{\overline{N/2}} + \dfrac{1}{\overline{N/2}} \right)}$;

$D = 2\sqrt{2}\, \dfrac{k^2 d\lambda}{A}$;

and $\theta \approx \dfrac{A}{d} \left( \dfrac{1}{2 - \dfrac{1}{\sqrt{2}}} \right)$;

where:

$c$ is the beam velocity within said cavity;

$\lambda$ is the beam wavelength;

$\tau$ is the delay time;

$N$ is the number of beam transits; and $k$ is a beam density factor greater than one.

2. The delay line according to claim 1 including means for amplifying said wave energy disposed between said mirrors.

3. The delay line according to claim 1 including:

means for recirculating said wave energy within said delay line;

means for amplifying said wave energy; and switching means for directing wave energy into and out of said cavity.